Feb. 6, 1968  W. H. SMYERS, JR  3,367,351
CONTROLLER
Filed July 26, 1966  2 Sheets-Sheet 1
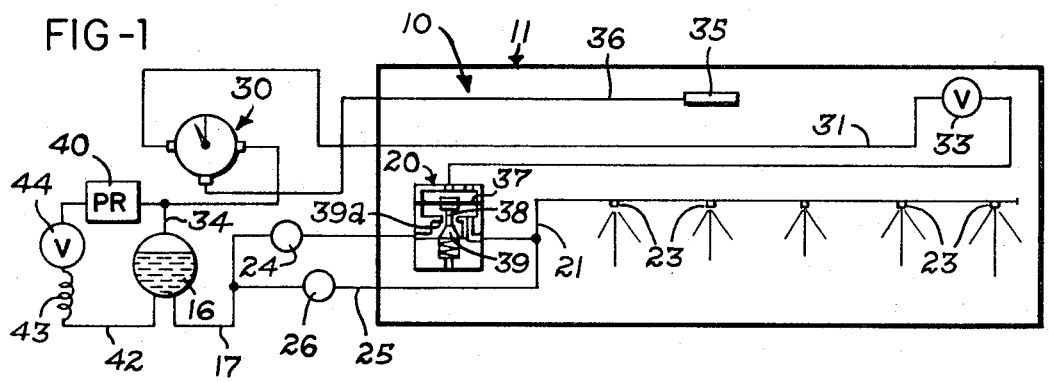
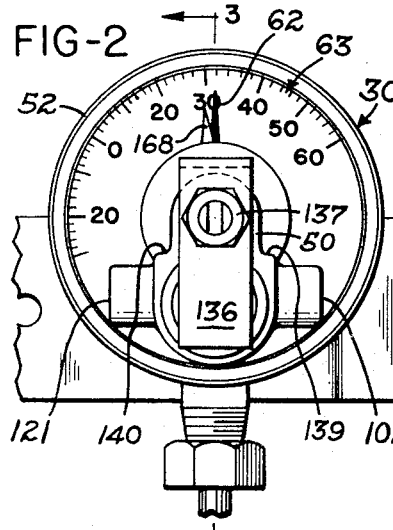
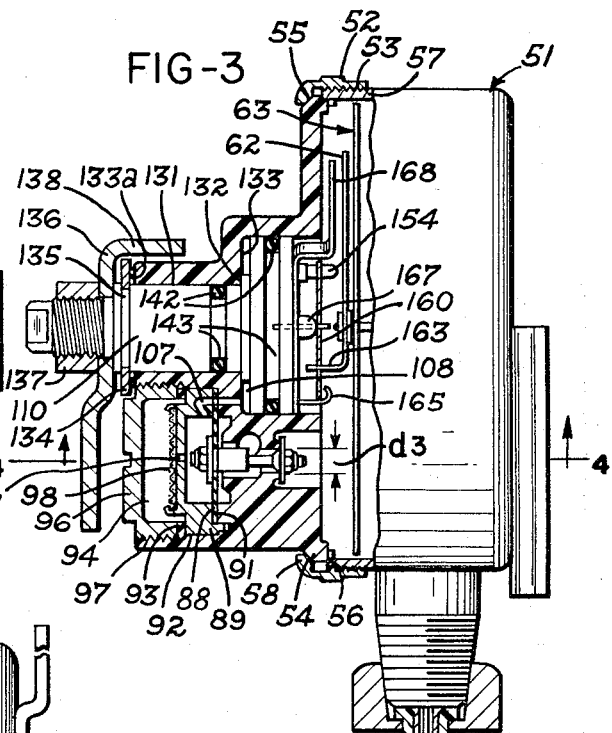
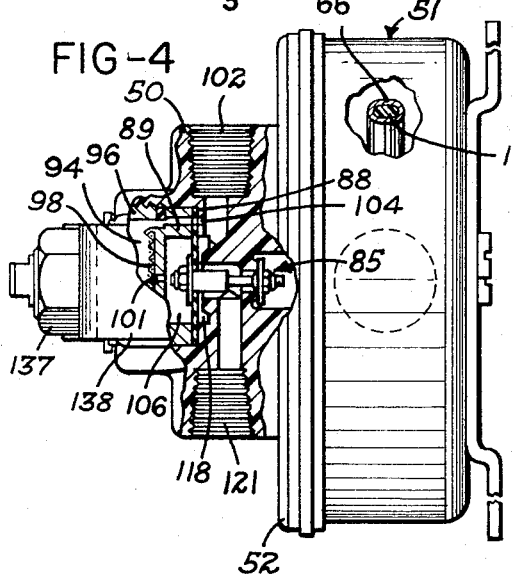
INVENTOR.
WILLIAM H. SMYERS, JR.
BY Marechal, Biebel, French & Bugg
ATTORNEYS

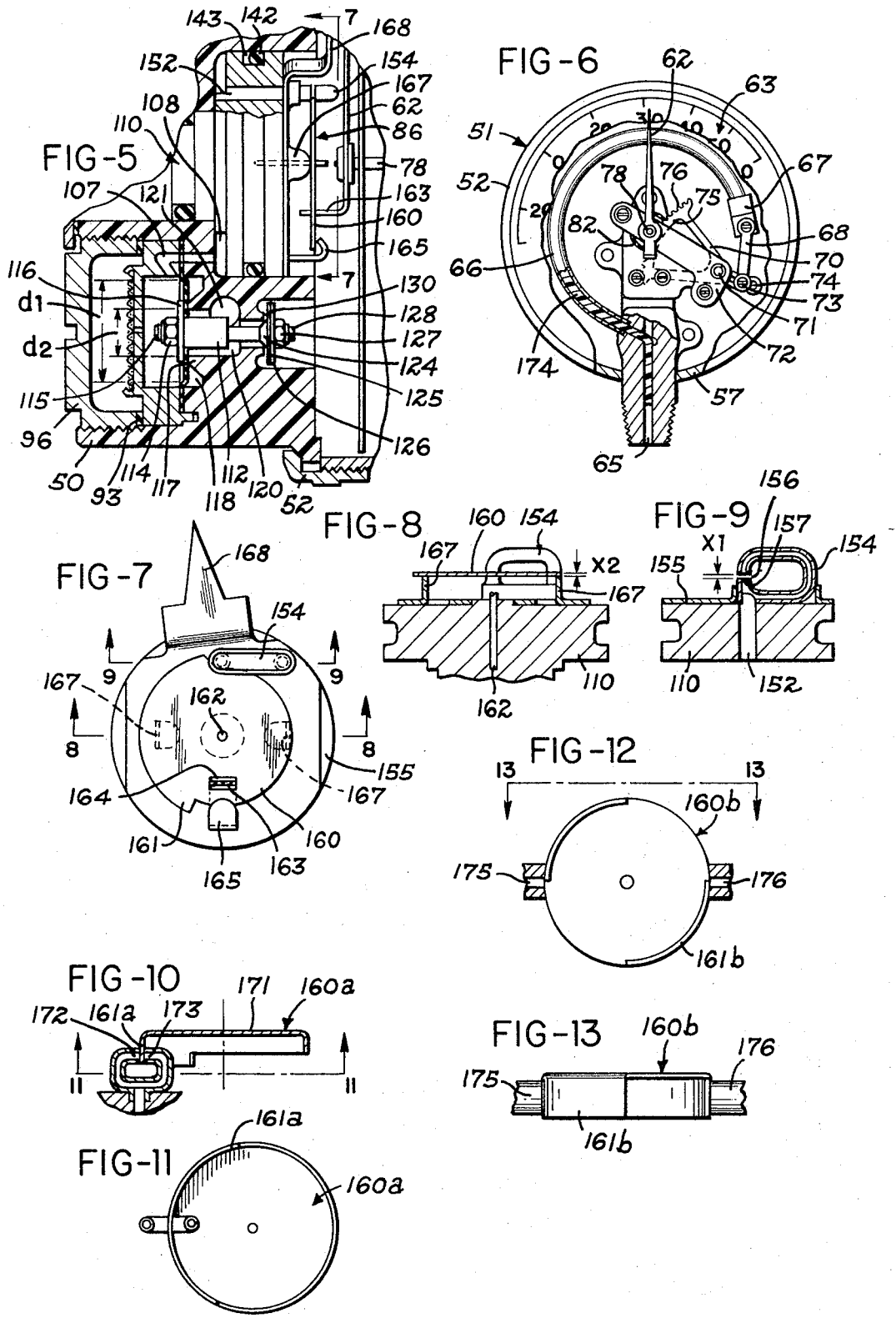

United States Patent Office 3,367,351
Patented Feb. 6, 1968

3,367,351
CONTROLLER
William H. Smyers, Jr., Dayton, Ohio, assignor to Koehler-Dayton, Inc., Dayton, Ohio, a corporation of Ohio
Continuation-in-part of application Ser. No. 356,426, Apr. 1, 1964. This application July 26, 1966, Ser. No. 568,030
18 Claims. (Cl. 137—83)

ABSTRACT OF THE DISCLOSURE

A control device adapted to vary the fluid pressure in a conduit as a result of a cam member being moved between a pair of opposed orifices which bleed air from the conduit. The cam member is moved by a needle on a Bourdon gage, and variation in the pressure in the conduit effects the positioning of a pilot valve. The spring element and lead conduit from the sensing element of the Bourdon gage contains a filler material so that the gage is insensitive to changes in the temperature around the gage and lead conduit.

---

This application is a continuation-in-part of my co-pending application for Refrigeration System Including Pressure Actuated Valve, Ser. No. 356,426, filed Apr. 1, 1964, now Patent No. 3,281,075 issued Oct. 25, 1966.

This invention relates to apparatus for controlling the flow of fluids, and particularly to a pneumatic indicating pressure or temperature controller.

Liquefied gas systems for refrigeration have come into use wherein liquid nitrogen or other liquefied gas is sprayed into the compartment to be cooled thereby reducing the temperature of the compartment. As the temperature rises within the compartment, a control system causes a certain amount of liquid nitrogen to be again sprayed in the compartment to reduce the temperature therein. One problem which has been encountered is that a proportional control causes only a small amount of liquid nitrogen to be supplied constantly to the compartment, so that only a very small spray is produced from the nozzles. In a large compartment, such as a railroad car, only the area surrounding the nozzles is cooled and thus it is possible for the corners and remote portions of the compartment to be at a temperature substantially greater than that surrounding the nozzles.

This invention is directed to a controller which will overcome the aforesaid difficulty by causing the controller to move to its full open position each time the liquid nitrogen is supplied to the compartment. This creates a maximum circulation within the compartment thereby effecting even cooling throughout the compartment. Although the invention will be described in connection with such a system, it is important to note that the controller described and claimed herein is not limited to such a system, and may in fact be adapted for use in many altogether different systems. It is therefore stressed that this invention is not limited to the refrigeration system with which it is described.

Accordingly, an important object of this invention is to provide a pneumatic temperature or pressure controller which is bistable and cannot balance midway, but shifts quickly between an open and a closed position thereby effecting either maximum flow or a complete shut-off condition.

Another object of this invention is to provide a controller of the aforesaid type which is mounted on and actuated by a needle type gage of any type, for example, a pressure or temperature gage, or a volt and ammeter, and further to provide such a controller which can be easily adjusted to effect operation at different positions of the gage.

A further object of this invention is to provide a controller of the character described wherein the operation thereof is controlled by a very small force, and particularly to provide such a controller wherein the actuator therefor is operated by the needle indicator of a pressure gage or the like without detrimental effect to the operation of the gage.

Another object of this invention is to provide a controller which is easily adapted for mounting on conventional pressure gages and which includes a self-centering actuator cam, and particularly to provide a controller of this type wherein the tolerances of the components are comparatively wide so that the manufacturing costs are low and the operational dependability thereof is superior to other devices.

Further objects and advantages of the invention will be apparent from the following description, the accompanying drawings and the appended claims.

In the drawings:

FIG. 1 is a schematic illustration of a refrigeration system using the controller of the present invention;

FIG. 2 is a front view of the front or face of the controller;

FIG. 3 is a sectional view taken along the line 3—3 of FIG. 2;

FIG. 4 is a bottom view, partially broken away along line 4—4 of FIG. 3;

FIG. 4A is a sectional view through the Bourdon tube and illustrating a modified form of the invention;

FIG. 4B is a sectional view through the Bourdon tube and illustrating another embodiment of the invention;

FIG. 5 is a view similar to FIG. 3 showing the controller in its alternate position;

FIG. 6 is an elevation view partially broken away of a Bourdon pressure gage showing the operating components thereof;

FIG. 7 is an elevation view taken generally along the line 7—7 of FIG. 5;

FIGS. 8 and 9 are sectional views taken along the lines 8—8 and 9—9 of FIG. 7;

FIG. 10 is a plan view of a modification of the invention;

FIG. 11 is a sectional view taken along the line 11—11 of FIG. 10;

FIG. 12 is an elevation view of another embodiment of the invention; and

FIG. 13 is a sectional view taken along the line 13—13 of FIG. 12.

Referring to the drawings wherein preferred embodiments of the invention are shown, FIG. 1 illustrates a typical liquefied gas refrigeration system for cooling the interior space 10 of the compartment 11. The refrigeration system includes a storage tank 16 which has a conduit 17 leading to the interior 10 of the compartment 11 and this conduit has a pressure actuated liquid control valve 20 therein for regulating the flow of liquid to the conduit 21 which extends along the length of the compartment 11 and has holes or spray nozzles 23 therein. A pressure relief valve 24 is provided in the conduit 17 for exhausting high pressures above a predetermined safe pressure from the conduit 17 or tank 16 to the atmosphere. The bypass conduit 25 is provided around the valve 20 so that, if the valve 20 becomes inoperative for one reason or another, the manually actuated valve 26 can be opened to introduce the liquid nitrogen into the space 10.

The operation of the liquid control valve 20 is regulated by a controller 30 which is the subject of this invention and which is connected to the valve 20 through the elongated conduit 31 having a normally closed valve 33 therein which is open when the door of the compartment 11 is closed and which shuts off flow from controller 30 and vents the line 31 downstream of valve 33 to atmosphere when the door is open. The valve 33 therefore prohibits operation of the pressure actuated valve 20 when a door is open since, if the nitrogen is sprayed during the time this door is open, injury to a person in the compartment and waste of liquid nitrogen may occur. The controller 30 regulates the gas pressure applied to the pressure actuated valve 20 through conduit 31 by controlling the gas supplied from the storage tank 16 and through the conduit 34 in response to the temperature within the compartment as sensed by the probe 35 connected to the controller 30 through the conduit 36. Thus when the gas pressure from the tank 16 is connected to the valve 20, which is normally closed, the diaphragm 37 therein moves the stem 38 downwardly to unseat the poppet 39 and allow flow through the conduit 17 at a rate proportional to the extent that the poppet 39 is spaced from the seat 39a.

A conventional pressure build-up system may be incorporated into the refrigeration system as shown in FIG. 1 including a pressure regulator 40 in the conduit 42 for sensing the pressure in conduit 34 and, when a preset low pressure is sensed, for opening the conduit 42 to allow liquid to flow from the tank 16 through the evaporation coil 43, the shut-off valve 44 and into the conduit 34 leading to the controller 30.

Referring now to the controller 30 which forms the subject of this invention, FIGS. 2–4 illustrate the controller body 50 which is secured to the face of a typical Bourdon type pressure gage 51 by the retaining ring 52 received on the threads 53. The radial flange 54 on the body 50 has a tapered shoulder 55 thereon which is clamped against the front peripheral edges 56 of the gage housing 57 by the inwardly extending shoulder 58 on the retainer ring 52. The body 50 is made of a transparent plastic material, and thus the needle or pointer 62 and calibrated scale 63 of the pressure gage 51 can be viewed from the front of the controller 30, as seen in FIG. 2.

While the type of pressure gage 51 is not a limitation of this invention, a typical Bourdon spring gage is shown in FIG. 6. The gage 51 has the inlet 65 connected to the interior of an elastic chamber Bourdon spring 66 which tends to straighten itself out when the pressure therein is increased. The free end 67 of this spring is connected by the link 68 to the lever 70 which is secured for pivotal movement on the pin 71 on the support bracket 72. The connection 73 between the lever 70 and the link 68 provides for adjustment within the slot 74, and the opposite end 75 of the lever 70 has a gear segment 76 formed thereon which engages a pinion, not shown, but integrally attached to the main support shaft 78 of the gage 51.

The indicator needle or pointer 62 is provided on this support shaft 78 for cooperation with the scale 63 to indicate the pressure within the Bourdon spring 66. In the usual manner, a light coil spring 82 is provided around the shaft 78 to eliminate loose play or backlash in the gear teeth, pivot joints and linkage. When the pressure increases within the spring 66 it begins to straighten out thereby moving the lever 70 to effect rotation of the pointer 62 to indicate the increased pressure.

The controller 30 further includes a poppet valve assembly 85 whose operation is controlled by the adjustable cam assembly 86 (FIG. 5) which is operated by the pointer 62 of the pressure gage 51. The poppet valve assembly 85 is shown in FIGS. 3–5, and includes a flexible diaphragm 88 of rubber or equivalent material which is held in place by the cup-shaped retainer 89 received in the body 50 to clamp the diaphragm 88 against the shoulder 91 at the base of the bore 92. A washer 93 of a material which is resilient and has a low friction coefficient, such as TFE, seals chamber 94 and permits the retainer 89 to be clamped in place without being twisted. The retainer 89 also defines outer pressure chamber 94 on the left hand side of the retainer 89, and this retainer is held in place by the externally threaded cap 96 which engages the complementary threads 97 within the bore 92. The retainer 89 includes a wire mesh filter 98 so that gas flowing into the chamber 94 and through the flow passageway 101 into the center of the retainer 89 has any dirt particles removed therefrom.

As seen in FIGS. 2–4, the inlet passage 102 extends horizontally into the body 50 and is connected to the outer chamber 94 between the cap 96 and retainer 89 by the passage 104 so that gas flowing from the inlet passage 102 passes into the chamber 94, through the filter 98, the passage 101, and into the inner chamber 106 between the retainer 89 and the diaphragm 88. Another passage 107 (FIG. 3) is formed partially in the retainer 89 and connects the inner chamber 106 with the annular chamber 108 formed between the body 50 and the shaft 110.

The poppet shaft 112 is secured at its left-hand end to the diaphragm 88 by the nut 114 and poppet extension 115 which extends through a suitable central opening in the diaphragm and threadedly receives the nut 114. The enlarged rigid washer 116 is clamped between the nut 114 and the diaphragm 88, and a raised annular shoulder 117 is provided in the body 50 around the shaft 112 to form a valve seat against which the diaphragm 88 can be moved to block the flow of gas from the annular chamber 118, which is in communication with inlet passage 102, to the outlet chamber 120 around the poppet shaft 112. The outlet chamber 120 is connected to the outlet passage 121 which is connected (FIGS. 1 and 2) to the valve 20, as described hereinabove.

The opposite end of the poppet shaft 112 has a tapered shoulder 124 formed thereon, and a rubber valve member 125 is clamped against this shoulder by the backing washer 126 and the nut 127 received on the threaded end portion 128 of the shaft 112. The valve member 125 cooperates with the annular valve seat 130 formed on the body around the vent opening so that, when the poppet shaft 112 is moved to the left, the valve member 125 engages the seat 130 and blocks flow between the outlet chamber 120 and the atmosphere which exists in the space to the right of the valve seat 130.

An important feature of this invention lies in the relationship of the diameters between the various effective areas within this poppet assembly 85. Accordingly, the effective diameter $d_1$ of the diaphragm 88 is greater than the diameter $d_2$ of the valve seat 117, whereas the diameter $d_3$ of the valve seat 130 is less than that of the valve seat 117.

The adjustable cam assembly 86 includes the shaft 110 which is received in the complementary bore 131 within the body 50, and is held in place against axial movement to the left by engagement between the radial shoulder 132 and the adjacent surface 133 of the body. Movement to the right is blocked by a washer 133a and the snap ring 134 in the groove 135 in the shaft 110, and the adjustment handle 136 is secured to the left-hand end of the shaft 110 by the nut 137 for rotating the shaft 110. The right angle projection 138 on the handle 136 extends parallel to the shaft 110 and will contact the stops 139 and 140 (FIG. 2) as the handle is rotated to limit the settings of the controller 30. The handle 136 can be adjusted with respect to the shaft 110 by loosening the nut 137. The O-ring seals 142 are provided in the grooves 143 to prevent the flow of gas between the shaft 110 and the body 50, and the annular chamber 108 is formed between the body 50 and the shaft 110, and thus the seals 142 substantially prevent the flow of gas from this chamber 108.

The passage 152 (FIG. 5) within the shaft 110 interconnects with the chamber 108, and the curved piece of tubing 154 is rigidly mounted on the end surface 155 of the shaft 110 (FIG. 9) and extending through approximately 360° so that the control orifice 156 in the end thereof is directly opposed to the control orifice 157 adjacent the shaft 110. Thus gas flowing through the passage 152 is ejected from the orifices 156 and 157 toward one another at substantially equal volumetric rates.

The orifices 156 and 157 are spaced apart a precise distance $x_1$ (FIG. 9), and this distance is sufficient to allow the disk-shaped cam 160, having a thickness $x_2$ somewhat less than $x_1$, to be moved therebetween to substantially reduce the flow through the orifices 156 and 157. The configuration of the cam 160 is seen in FIG. 7, and includes a flat piece of metal having the enlarged radial cam lobe 161 thereon so that rotation of this cam 160 moves the lobe 161 from a position spaced from the orifices 156 and 157 to a position between these orifices, and vice versa.

The cam 160 is rotated by the pointer 62 on the pressure gage 51 as described below, and support therefor is provided by the pin 162 which is secured axially in the shaft 110 and extends beyond the end surface 155 thereof, as seen in FIGS. 3 and 5. The cam 160 is mechanically rotated by the lower section 163 of the pointer 62 which extends at a right angle to the face of the dial 63 and through the slot 164 cut in the cam 160. Thus, rotation of pointer 62 effects rotation of the cam 160 about the axis of the pin 162 so that the cam lobe 161 is rotated between the orifices 156 and 157. A J-shaped retainer 165 is provided on the shaft 110 opposite the orifices 156 and 157 for holding the lower portion of the cam 160 in position, and the spaced ears 167 limit the movement of the cam 160 to the left, as viewed in FIG. 3. An important feature of this arrangement is that the center lines of pin 162 and hub 78 need not be exactly coaxial nor even parallel for proper operation since the section 163 of pointer 62 can slide axially and radially in cam slot 164 while still providing positive tangential movement.

The position of the control orifices 156 and 157 can be adjusted in an angular direction with respect to the dial 63 by rotating the handle 136 which causes the shaft 110 to be similarly rotated. A pointer 168 is rigidly secured to the shaft 110 and extends radially upward therefrom so that it is visible through the body 50, as shown in FIG. 2, and thus its position and the position of the orifices 156 and 157, can be determined with respect to the scale 63 and the pointer 62.

As indicated above, the probe system includes the hollow probe 35 itself which is mounted in the compartment 10 and is connected to the controller 30 by the conduit 36. The probe 35 contains pressurized carbon dioxide in an equilibrium state wherein a portion of it is gaseous and a portion liquid throughout the temperature range of operation. Because the $CO_2$ is in its equilibrium state, the system is substantially insensitive to volumetric changes and any temperature change causes a proportional pressure change. Thus, as the temperature increases, some of the carbon dioxide is evaporated from the liquid state, thereby increasing the pressure within the gage 51 and appropriately moving the needle 62. When the temperature decreases, a proportionate amount of the $CO_2$ is liquefied thereby decreasing the pressure in the gage 51.

Both the line 36, which is of capillary size, and Bourdon spring 66 are partially filled with a wire and strips of Teflon, respectively. If the entire line 36 and Bourdon spring 66 were filled with carbon dioxide, and they had significant volume compared to the volume of the probe 35, the pressure within the system would be affected if the temperature in the line 36 or controller 30 were lower than that of the compartment 10, so that the system would not indicate a true temperature with the compartment 10. Under these conditions, all the liquid carbon dioxide can migrate to the Bourdon tube 66 and capillary line 36 leaving no liquid to be in equilibrium with gaseous carbon dioxide in the probe. It is therefore important to keep the internal volume of the Bourdon spring 66 and the capillary line 36 as small as possible.

The Bourdon spring and conduit 36 can thus be filled partially with a wire 170 (FIG. 3), or Teflon strips 170a (FIG. 4A). In addition, the spring 66 and conduit 36 can also be filled with other flexible materials such as strips of nylon or thin metal, or they may be evacuated and filled with a liquid of high viscosity or surface tension so that the liquid will remain in the Bourdon tube 66, such as grease or mercury 170b (FIG. 4B). A liquid mixture which will solidify to a substance 174 resilient enough to transmit pressure, such as a soft rubber or plastic material, can also be used. Each of these embodiments prohibits the ambient temperature around the line 36 and the Bourdon spring 66 from effecting the reading of the gage 51 or the operation of the controller 30.

In operation of the controller 30, an increase in pressure within the line 36 leading from the probe 35 to the pressure gage 51 causes the pointer 62 to be rotated by the shaft 78, as described above. Since the disk cam 160 is secured to this pointer, it similarly rotates to remove the cam lobe 161 from between the control orifices 156 and 157 and thereby greatly reducing the pressure in chamber 106. The cam 160 is self-centering since it is free to float axially within limits on the support pin 162, and thus the balanced flow of gas through the orifices 156 and 157 causes the cam 160 to be positioned substantially midway therebetween (see FIG. 8). An air bearing arrangement thus centers the cam 160 so that only a very small amount of force is required to rotate the cam.

This very small operating force is a very important part of this invention, because any significant force requirement in one direction would overcome the hairspring 82 or resist the movement of the Bourdon spring 66, thereby yielding an erroneous pressure gage reading. An important feature of the low operating force of this invention is that the pressure forces exerted by the control orifices 156 and 157 on the cam 161 are balanced in such a direction that they impart neither a rotational torque nor any frictional drag of any significance to the cam. While the cam 160 is between the orifices 156 and 157, there is a certain amount of gas leakage therefrom, but as will be seen, this is not objectionable and the arrangement operates effectively to terminate gas flow through these orifices.

When the cam 160 is in its position wherein the cam lobe 161 is not between the control orifices 156 and 157, the poppet valve assembly 85 is in its open position. That is, the inlet pressure in the line 34 flows through the passage 102 and into the chamber 118 from where it passes into the outlet chamber 120 on the right-hand side of the diaphragm 88, and then into the passage 121 leading to the valve 20. This pressure acts on the right-hand side of the diaphragm 88 to urge it to the left, causing movement of the shaft 112 to the left and seating of valve member 125 to close the vent opening so that the entire flow of gas is into the outlet opening 121 leading to the valve 20.

During this time, the inlet passage 102 also is connected to the inner chamber 106 through the passage 104, outer chamber 94, and passage 101, so that the gas pressure tends to act on the entire area of the left side of the diaphragm 88. However, the inner chamber 106 is vented to atmosphere through the passage 107, the annular chamber 108, passage 152, and control orifices 156 and 157, and thus the gas pressure cannot build up within the inner chamber 106, so shaft 112 is held to the left by the pressure on the right side of diaphragm 88.

Once the temperature is reduced in the compartment 10, the pressure in the probe system falls and the pointer 62 moves the cam lobe 161 to a position between the control orifices 156 and 157, which substantially blocks flow of gas through the passage 152 leading from the inner chamber 106 so that pressure in this chamber increases to essentially full inlet pressure. The diaphragm 88 is thus essentially balanced, with inlet pressure on its entire area of both sides thereof, but member 125 has inlet pressure on the left side and atmospheric pressure on the right side thereof. This imbalance on an area corresponding to $d_3$ starts to move the entire poppet assembly 85 to the right. Once this movement starts, the imbalance becomes greater as the pressure on the right side of diaphragm 88 out to the diameter $d_2$ decreases to atmospheric and the poppet assembly 85 comes to rest with diaphragm 88 seated on valve seat 117 where the member 125 is balanced with atmospheric pressure on both sides thereof. The diaphragm 88 is also balanced with inlet pressure on both sides of the annular area between diameters $d_1$ and $d_2$, but being unbalanced to the right on the area corresponding to $d_2$. The flow of gas pressure to the valve 20 is then immediately terminated, and the actuator closes the valve 39 to cut off the flow to the nozzles 23.

When the cam lobe 161 is removed from between the openings once again due to an increase in temperature in the compartment 11, the pressure within the inner chamber 106 immediately falls since the cam 160 is removed from between the orifices 156 and 157. This causes the pressure acting on the right-hand side of the diaphragm 88 between the valve seat 117 and the outer periphery thereof to start movement thereof to the left to the open position wherein the vent valve member 125 is again seated and the pressurized gas again flows from the inlet passage 102 to the outlet 121.

The particular probe pressure (e.g., temperature) at which the controller shifts between its on and off positions can be adjusted by merely turning the handle 136 on the front of the controller. Rotation of this handle effects rotation of the shaft 110 and thus the control openings 156 and 157 with respect to the position of the cam 160 and pointer 62 of the gage. Assuming the adjustment to a lower pressure is desired, the handle 136 is rotated in a counterclockwise direction so that the cam 160 is moved from between the orifices at the lower pressure. By rotating the handle in the clockwise direction the pressure at which the assembly 85 opens is similarly raised. As indicated above, the pointer 168 extends upwardly from the tube so that it can be viewed through the transparent body 50 in relation to the scale 63 so that the setting of the controller is easily determined.

In summary, when the temperature within the compartment 11 rises, there is an increased pressure in the probe 35 which moves the pointer 62 on the gage 51. As this pressure increases, the Bourbon spring 66 moves the pointer 62 to proportionally indicate the temperature within the compartment 11, and moves the cam lobe 161 from between the orifices 156 and 157 when the temperature setting is reached. This causes the controller 30 to be shifted to its open position as described above wherein the gas in the inlet passage 102 is allowed to flow to the outlet passage 121 and thus to the actuator valve 20 which is immediately shifted to its open position. The flow of liquefied nitrogen or other liquefied gas through the lines 17 and 21 immediately commences under full pressure to be sprayed from the nozzles 23 causing maximum circulation of the air within the chamber 10 so that the entire space is cooled to a uniform temperature.

When the temperature is reduced to that desired in the compartment 11 there is a decrease in the pressure of the liquid within the probe 35 transmitted to the Bourdon spring 66, and the pointer 62 is correspondingly moved to illustrate this lower temperature. The movement of the pointer 62 moves the cam lobe 161 between the control openings 156 and 157 once again, and this action immediately shifts the poppet shaft 112 to the right as described above thereby shifting the controller 30 to its closed position, to block the pressure from passage 102 and to vent the outlet passage 121 thus closing actuator valve 20 to terminate flow of the liquefied gas to the conduit 21.

FIGS. 10 and 11 illustrate another embodiment of the invention wherein the cam 160a is cup shaped and the cam lobe 161a projects perpendicularly to the flat surface 171 of the cam. The cam 160a can be rotated by the pointer 62 or any other member which is connected with a sensing mechanism. As the cam passes between the orifices 172 and 173, the flow of gas therefrom is greatly reduced in the same manner as described above, whereas when the cam lobe is removed therefrom flow is increased and the poppet 112 is allowed to shift to its closed position.

Another embodiment of the invention is shown in FIGS. 12 and 13 wherein the orifices 175 and 176 are disposed in opposite sides of a cup-shaped cam member 160b having the lobes 161b depending from the outer periphery thereof. The cam can be rotated in manners similar to the cams 160 and 160a to move the cam lobes 161b to a position adjacent the orifices 175 and 176, or to a position spaced therefrom for maximum flow therethrough. In this manner, the flow through the orifices 175 and 176 is varied to control the position of the poppet 112, as explained above.

The controller 30 has been described as controlling the flow of nitrogen gas, which in turn actuates a valve which regulates the flow of liquefied nitrogen refrigerant. However, it is within the scope of this invention to control the flow of any gas or liquid by this controller. Moreover, the gas or liquid in turn may actuate other devices, such as, cylinders or fluid motors directly. Also, the controller can be changed from an on-off controller to a proportional controller by using a spring to resist movement of the poppet shaft 112 in one direction or the other and making the two seat areas the same, instead of different, or making the diameter $d_3$ of the seat 130 larger than the diameter $d_2$ of the inlet seat 117. In this manner, the pressures acting on the poppet assembly 85 gradually open and close the valves, so that it is possible to have a partially open vent and partial flow to the outlet 121. The cam lobe 161 can have a very gradual slope on its operating edge so that it gradually closes off the flow from the control orifices for proportional control.

The controller 30 can also be used in other air conditioning systems and the like, for example, a heating system. This latter example might necessitate the reversal of the cam 160 so that a decrease in temperature causes the cam lobe 161 to be withdrawn from between the control orifices 156 and 157. This permits the poppet assembly to open and allow heating fluid to flow to the space being heated.

It is also within the scope of this invention to provide more than one pair of opposite orifices each with a cooperating cam blade lobe or its equivalent to control the positioning of more than one poppet assemblies or other fluid device. The cam blade can thus have a series of related cam lobes or a plurality of cam blades means can be stacked together. The advantage of using two or more pairs of orifices with cooperating cam lobes is that a series of related functions can be easily controlled while the relationship between such function remains substantially constant.

The controller 30 can be used in conjunction with any type of indicator gage wherein a needle or pointer is provided, such as an ammeter, volt meter, speedometer or other types of pressure gage where at least a very low force is available. This is possible since only a very small force is required to move the free floating cam 160 between the control orifices 156 and 157. The invention has also provided a controller which does not require high tolerances during manufacture but provides extreme accuracy in operation. The controller can also be adjusted manually to vary the temperature or pressure at which it opens and closes the valve, and the poppet assembly 85 snaps quickly between its on and off poistion.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A controller comprising, a housing, a movable member in said housing, means defining a first chamber in said housing adjacent a first side of said movable member, means defining a second chamber in said housing adjacent the second side of said movable member, an annular valve seat in said first chamber adapted to be contacted by said movable member to block flow through said valve seat, a passage communicating with said valve seat for receiving flow from said first chamber through said valve seat, an outlet communicating with said passage, means defining a vent opening communicating with said passage, a valve member on said movable member for closing said vent opening when said movable member is in a first position psaced from said valve seat and for opening said vent opening when said movable member is in a second position in engagement with said valve seat, inlet means for connecting a source of pressure to said first chamber, restricted passage means connecting said inlet means to said second chamber to subject said second side of said movable member to the inlet pressure, and control means for selectively varying the venting of said second chamber to effect the escape of pressure from said second chamber to move said movable member to said first position to close said vent opening and connect said inlet means to said outlet or for allowing the build-up of pressure in said second chamber to cause the pressure acting on said second side and said valve member to move said movable member to said second position wherein said movable member seats against said valve seat and disconnects said outlet from said inlet means.

2. A controller as defined in claim 1 wherein said control means includes means in said housing defining a pair of control orifices communicating with said second chamber and being disposed in aligned opposed relationship and spaced apart by a preset distance, free floating blade means having a thickness slightly less than said preset distance, and indicator means having a connection with said blade means adapted to move said blade means between said control orifices to block substantially the flow of fluid through said control orifices to increase substantially the pressure in said second chamber.

3. A controller as defined in claim 2 wherein the portion of said control orifices can be adjusted to vary the point at which said movable member shifts between said first and second positions.

4. A controller as set forth in claim 1 wherein the effective diameter of said movable member being larger than the effective diameter of said first seat, said first seat effective diameter being greater than the effective diameter of said vent opening adjacent said valve member such that said movable member will snap from said one position to the said second poistion without being stable at any intermediate position as the pressure in said second chamber changes.

5. A controller for controlling the flow of fluid through a passage comprising, a housing, a pressure actuated operator adapted to poistion a valve which controls the flow of fluid through the passage, means defining a pair of control orifices communicating with said pressure actuated operator and being disposed in aligned opposed relationship and spaced apart by a preset distance, cam means having a thickness slightly les sthan said preset distance, spaced support members adapted to hold loosely said cam means in a plane generally perpendicular to the axis of said control orifices, and movement means having a connection with said cam means for moving said cam means between said control orifices to block substantially the flow of fluid through said control orifices to change substantially the pressure or the flow of fluid from said pressure actuated operator to shift said valve.

6. A controller as set forth in claim 5 wherein manual adjustment means are provided for changing the position of said control orifice to change the point at which flow through said control orifices is substantially reduced.

7. A controller as set forth in claim 5 wherein said cam means is a flat member having a radial cam lobe on the periphery thereof, and means for mounting said cam means for rotation so that said cam lobe can be rotated between said orifices.

8. A controller as set forth in claim 5 wherein means are provided for mounting said cam means to enable limited free floating movement thereof so that said cam means is centered between said orifices by the fluids flowing through said orifices.

9. A controller as set forth in claim 5 wherein said movement means is a conventional pressure gage having its indicator connected to said blade means for moving said cam means.

10. A controller as set forth in claim 5 wherein said cam means is cup shaped with a cam lobe formed on the periphery thereof and extending axially on said cam means, and means for mounting said cam means for rotation so that said cam lobe is moved between a first position wherein said cam lobe is disposed between said orifices and a second position wherein said cam lobe is spaced from said first position.

11. A controller as set forth in claim 5 wherein said cam means is annular and cup shaped with a pair of cam lobes formed on the periphery thereof and extending axially of said cam means, said orifices being spaced apart a distance slightly greater than the diameter of said cam means so that rotation of said cam means moves said cam lobes simultaneously into alignment with said orifices to substantially reduce the flow of fluid therethrough.

12. A controller as set forth in claim 9 wherein said indicator has an extension thereon which projects through a slot in said cam means, said slot being larger than said extension to permit relative movement between said extension and said cam means.

13. A temperature sensing device comprising, a Bourdon tube, a hollow probe, a hollow tube interconnecting said probe and said Bourdon tube, filler means occupying at least a portion of the volume of said tubes, a fluid filling the remaining portion of said tubes and said probe for changing its pressure in response to changes in the temperature being sensed, said filler means decreasing the volume of said Bourdon and hollow tubes so that said device is substantially insensitive to changes in the ambient temperature around said Bourdon and hollow tubes.

14. A sensing device as defined in claim 13 wherein said filler means is one or more strips of a flexible solid material.

15. A sensing device as defined in claim 13 wherein said filler means is a liquid of high enough viscosity or surface tension that it will not flow out of the Bourdon tube but will transmit pressure from said probe to said Bourdon tube.

16. A sensing device as defined in claim 15 wherein said filler means is mercury.

17. A sensing device as defined in claim 13 wherein said filler means is a liquid mixture which solidifies in the Bourdon tube to a texture resilient enough to transmit pressure from said probe to said Bourdon tube.

18. A control device for varying the pressure or flow in a duct comprising, a pair of passage means each connected to said duct and dividing the flow from said duct, a control orifice on each of said passage means, said control orifices being opposed and spaced apart a preset distance, control means adapted to be inserted between said orifices, said control means having a thickness slightly less than said preset distance to change substantially the pressure in said duct means for mounting said control means for free movement between said control orifices, and means for supplying fluid under pressure to said duct and passage means so that the fluid normally flows from each of said orifices at the same pressure and volume to center said control means therebetween.

(References on following page)

References Cited

UNITED STATES PATENTS

| | | | |
|---|---|---|---|
| 2,035,472 | 3/1936 | Hammond | 137—551 XR |
| 2,487,686 | 11/1949 | Zuehlke | 73—386.6 XR |
| 2,794,444 | 6/1957 | Markey | 137—81.5 XR |
| 2,919,712 | 1/1960 | Markey | 137—81.5 XR |
| 2,907,337 | 10/1959 | Bemporad | 137—83 |
| 3,071,157 | 1/1963 | Robertson et al. | 137—82 XR |
| 3,223,102 | 12/1965 | Kies | 137—82 |
| 3,245,619 | 4/1966 | Kreuter | 236—82 XR |
| 3,251,228 | 5/1966 | Hanebuth | 73—368.6 XR |
| 3,258,202 | 6/1966 | Schwartz | 73—368.6 XR |

HENRY T. KLINKSIEK, *Primary Examiner.*